Jan. 27, 1959  R. E. FLAHAUT  2,870,668
NUT THREAD WITH PITCH DIFFERENCE RELATIVE TO BOLT THREAD
TO PROVIDE GOOD THREAD BEARING UNDER LOAD
Filed June 16, 1953

United States Patent Office 2,870,668
Patented Jan. 27, 1959

2,870,668

NUT THREAD WITH PITCH DIFFERENCE RELATIVE TO BOLT THREAD TO PROVIDE GOOD THREAD BEARING UNDER LOAD

René E. Flahaut, Pavillons-sous-Bois, France

Application June 16, 1953, Serial No. 362,018

Claims priority, application France June 20, 1952

6 Claims. (Cl. 85—32)

This invention relates to nuts, bolts and such threaded members, and has for its principal object the provision of a nut-and-bolt assembly in which the nut and bolt are so designed as to ensure, after tightening, a good bearing of their threads, and to avoid concentration of stress on any part of these threads, more particularly on the parts thereof situated just above the level of the pressing face of the nut.

Another object is the provision of a nut having in combination a thread of a pitch greater than that of the bolt on which the nut is to be mounted, and a structure adapted to increase its deformability, so that the deformation of the nut coacts with the elongation of the bolt to ensure the desired good bearing of the threads, and the avoidance of detrimental stress concentration.

These and other objects will be apparent after referring to the accompanying drawing, in which.

Figure 1:
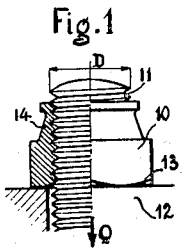
Fig. 1 is a side elevation, partially in section, of one embodiment of the present invention.
Figure 2:
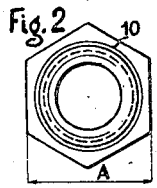
Fig. 2 is a top plan view of the nut shown in Fig. 1.
Figure 3:
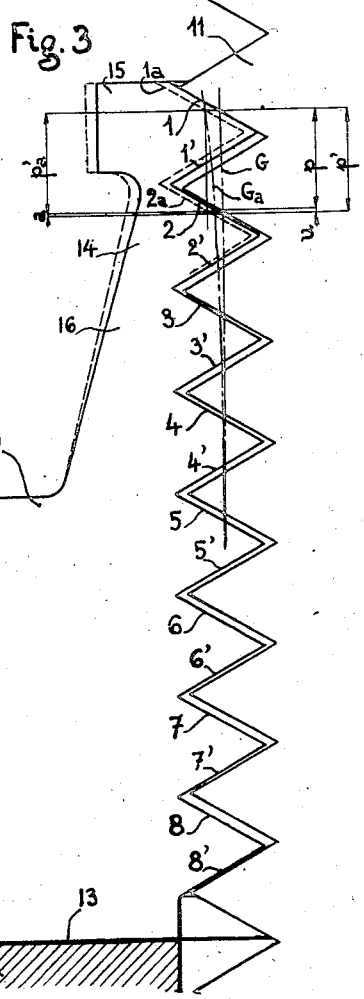
Figs. 3 and 4 are enlarged schematic section, corresponding to the left part of Fig. 1, and showing the relative positions of the threads, before and after tightening, respectively.

Referring to Figs. 1 to 3, there is a nut 10 in engagement with a threaded rod 11, for instance the end of a bolt or other threaded member, and in contact by its pressing face 13 with a work 12. The nut 10 is provided, on the side opposite its pressing face 13, with a narrowed part 14 comprising a flange 15 and a conical part 16. The pitch $p'$ of the thread on the nut is greater than the pitch $p$ of the thread on the threaded rod, in a proportion which will be hereinafter indicated. As a consequence of the pitch difference, at the beginning of the tightening, when the pressing face 13 of the nut contacts the work 12 without pressing thereon, there is, as illustrated in Fig. 3, contact on the upper surface or flank 1 of the first spire from top of the nut thread, a small clearance or play above the flank 2 of the second spire, a little greater play above the flank 3, a still greater play above the flank 4, and so on, a play greater and greater as the distance from the top of the nut increases. On the other hand, the play is relatively large under the flank 1' of the first spire from top of the nut thread, smaller under the flank 2', still smaller under the flank 3', and so on, downwardly smaller and smaller till it becomes very small under the flank 8'.

As the tightening proceeds, an axial force Q appears in the threaded rod and increases with the tightening. This axial force is at first only supported by the flank 1, and several phenomena occur: (1) the threaded rod is stretched, whence an increase of its pitch; (2) the nut is compressed, whence a decrease of its pitch; (3) the narrowed part 14 is widened, whence an additional decrease of the pitch of the nut, as it is apparent from Fig. 3, in which it is illustrated, for the purpose, an exaggerated widening which has brought from G to $G_a$ the mean generatrix of the upper flank of the nut thread; the flank 1 has come into $1_a$, and the flank 2 into $2_a$; such a widening changes the pitch $p'$ between the flanks 1 and 2, into a pitch $p'_a$ between $1_a$ and $2_a$; in other words, there is a decrease $a = p' - p'_a$ of the pitch of the nut.

The aforesaid three phenomena, and also the bending of the threads, coact to render smaller and smaller the difference between the pitch of the nut and the pitch of the threaded rod, as the axial force in the latter becomes more and more important; so that the tightening causes a progressive downward extension of the contact between the threads, and consequently, an increase of the length of bearing of the threads.

Figure 4:
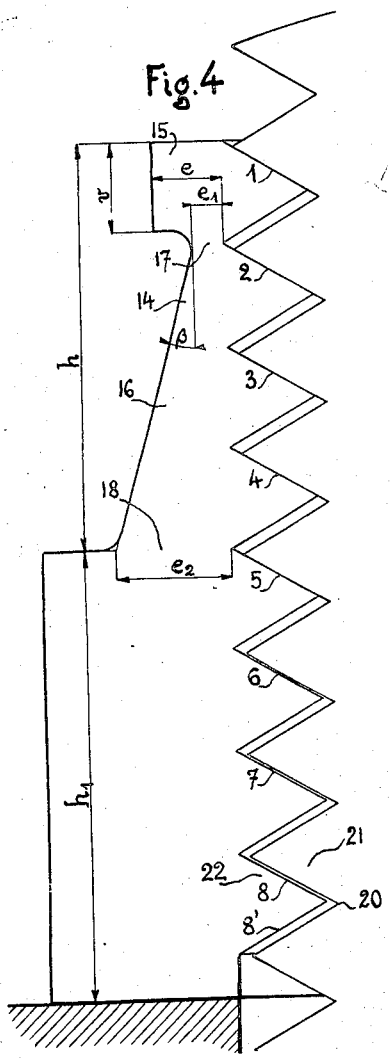

The pitch excess $u = p' - p$ and the profile of the narrowed part 14 are conjointly determined so that, after a mean tightening, the bearing is extended on the three or four upper spires of the thread of the nut, without occurrence of detrimental permanent deformations of the threads. The bearing is then as illustrated in Fig. 4: there is contact of the flanks 1, 2, 3, 4 and 5; the bearing is effective on the flanks 1, 2, 3 and 4, with a bearing pressure well enough distributed; from flank 4 downward, the bearing pressure decreases and becomes null on flank 5 or thereabout; still downward the contact ceases but the play is so small that the contact is on the point to take place, so that if the tightening is intensified, the bearing is downwardly extended, for instance so far as flank 6, the bearing pressure becoming substantial on flank 5, being slightly increased on flank 4, and not much changed on flanks 3, 2 and 1.

The flange 15 constitutes a sort of elastic hoop which controls and limits the bearing pressure on flank 1. And the conical part 16 constitutes a sort of solid of equal resistance to compression; the area of the cross-section is very reduced at the throat level 17, where it only has to carry the load acting on the flank 1, below, it progressively increases until to be sufficient at the level 18, to carry the load acting on the flanks 1, 2, 3 and 4, i. e. the whole or major part of the axial force of tightening. The axial compressibility of the nut, and therefore its axial deformation are thus greatly increased; all the more so, that it may be admitted, in the conical part 16, very high compressive stress, without risking the production of permanent deformations liable to develop; for, on the one hand, the resisting area increases with the deformation, since this deformation is a deformation of compression, and on the other hand, there is an automatic limitation of the axial load acting on the upper spires of the nut thread, since, in proportion as these spires yield, the bearing is extended on more inferior spires which then intervene to carry a part of the tightening axial force, so that this force may be increased without causing an important increase of the axial load acting on the upper spires of the nut thread.

A pitch excess and a narrowed part as hereinbefore specified form a true and in practice very useful combination. If the nut had a narrowed part without having a pitch excess, the tightening axial force would be only carried by the under spires of the nut thread, so that the narrowed part would have no utility, for the purpose of the invention. And if the nut had a pitch excess, without having a narrowed part, the nut deformation, in the course of tightening, would be negligible, and the elongation of the threaded rod would intervene practically alone, to produce the extension of the length of bearing of the threads. In order that this elongation does not cause permanent deformation of the material, the unit excess of pitch, i. e. the ratio $u/p$ should be kept under a critical value of the order of .001; now a so small unit excess of pitch could not be practically realized, for the cutting of the threads on the nut and threaded rod introduces, in the best conditions of mass production machining, pitch errors relatively more important than the required pitch excess, so that, in general, either no pitch excess would be present, or the realized pitch excess would be so much greater than required that only the upper spire of the nut thread would carry the tightening axial force, and detrimental permanent deformations would necessarily occur.

The presence of a narrowed part combined to that of a pitch excess, causes the nut deformation to coact with the elongation of the threaded rod to produce the desired good bearing of the threads, and influences the value of the pitch excess to be provided on the nut. The more deformable by compression and widening is the narrowed part, the greater has to be the pitch excess, which permits of having a unit excess $u/p$ of the order of .003 and even much greater, and consequently, of surely obtaining a good bearing of the threads, in spite of unavoidable errors in the making of these threads.

In view to increase to the utmost the unit excess of pitch, it is of interest to increase as much as possible the deformability of the nut, both at compression and at widening of its upper part. However, the narrowed part has to be sufficiently strong to bear the stresses acting thereon, and the height of the nut should not be much greater than the height of a usual nut. It is difficult to give a general dimensioning applying in all cases, for numerous factors intervene, notably the diameter, the pitch of the thread, the material of the nut and the threaded rod; besides it is possible to modify the profile of the narrowed part and the pitch excess corresponding thereto, and still obtain interesting results. It will be indicated as an example that, for a nut of soft steel, to be mounted on a threaded rod having a diameter $D=16$ mm. and a pitch $p=2$ mm. (international screw-thread), the following values may be suitable:

$h=6$ to 9 mm.    $e=1$ to 1.8 mm.    $v=1.5$ to 2 mm.
     $e_1=.4$ to .8 mm.    $\beta=10$ to $16°$ with a unit excess $$\frac{u}{p}=.003 \text{ to } .007$$

i. e. with a pitch $p'=2.006$ to 2.014 mm.

Such values are in no way critical, and the indicated limits may be overreached without preventing the obtaining of advantageous results, provided it is observed, according to the hereinbefore given general indication, the right relation between the unit excess of pitch, and the deformations consecutive to the tightening and depending on the profile of the narrowed part of the nut. On another hand, the width A of the nut may be smaller than usual, and the total height $h+h_1$ greater, in order to have a height $h_1$ sufficient for a good hold of the wrench.

A nut according to the invention has the property to fit automatically to pitch excesses of various values, as may be encountered in practical use. If, for instance, instead of a theoretical unit excess .005, there is in practice a unit excess .003, the contact of the threads will, in the course of the tightening, extends more downwardly on the nut, it may take place so far as 7, and even 8; the upper spires of the nut thread are then a little less loaded, but still carry a great part of the axial force of tightening, so that the under spires cannot be overloaded. If, on the contrary, there is in practice a unit excess .007, the load over 1 tends to overreach the assigned limit, but then the upper part of the nut will give up permanently a little, and for the upper spires of the nut thread, everything will happen as if the unit excess was brought to a suitable value; in other words, there is always a good bearing of the threads, at least on the flanks 1, 2, 3, and more or less downwardly extended according to the unit excess effectively realized and the intensity of the tightening. In any case, the load on the under spire of the nut thread, on 8 in the contemplated example, is null or small; it results therefrom that the stress at 20 in the material of the threaded rod is only the tensile stress due to the elongation of the threaded rod without having the superposition of stresses due to the bending of the spire 21, since this one does not practically press on the under spire 22 of the nut. With a usual nut, on the contrary, the latter stresses have important values, and their superposition to the tensile stress is a cause of very important local permanent deformation, and even, when the threaded rod is of a not ductile material, of cracks liable to develop and finally produce breakage of the threaded rod. The elimination of this detrimental cause constitutes a precious advantage of the nuts according to the invention.

Moreover, due to the form of the nut, when, during the tightening, contact occurs on flank 2, the tensile stress is small in the threaded rod; when, thereafter, contact occurs on flank 3, the tensile stress is increased, but only in that portion of the threaded rod which is below the level of flank 2; and so on . . . as the nut is tightened more and more, the tensile stress increases in the threaded rod, not in the whole portion in engagement with the nut, but only in the portion below the last flank which has come into contact; in other words, the tensile stress in the threaded rod very progressively increases from the thread spire corresponding to flank 1 down to the thread spire corresponding to the last flank which has come into contact; and this means that there is nowhere stress concentration in the threaded rod.

The play between threads should preferably be sufficient to allow an easy mounting of the nut, in spite of the pitch excess of its thread; in other words, it is preferable that, before tightening (case of Fig. 3), when there is contact on flank 1, there is a play under flank 8'. This play may be very small, since it increases with the tightening, and that, consequently, neither jamming nor gripping of the threads are liable to result from the insufficiency or absence of this play; however it is preferable that such a play exists to allow a manual screwing of the nut, without requiring a premature use of a wrench, and also to avoid too much accuracy in the cutting of the threads, for the play under 8' depends not only on the pitch excess, but also on the thicknesses of the threads, which thicknesses it is somewhat difficult to realize with precision. As the pitch excess is small with respect to the usual commercial play between threads, this play is, in general, large enough to be suitable for nuts according to the invention; besides, this play may be a little increased, if it is desired to have nuts which are very loosely mountable on their bolts.

The plays, before tightening, over the flanks 2, 3, 4, etc. do not depend on the thicknesses of the threads, but only on the pitch excess, and are therefore actually obtained, provided that the pitches on the nut and threaded rod present the wanted difference. This difference being realizable with the utilization of ground tools and usual means of mass production, it is possible to obtain, at a low price, nuts actually presenting the required characteristics to attain the object of the present invention.

The invention may be satisfactorily carried out in combining an excess of pitch with other structures than the one illustrated in Figs. 1–4. For instance, the nut may be simply tapered at its upper end, i. e. may be provided with a narrowed part 14 having no flange 15;

or the conical part 16 may have a curved profile, or be otherwise different from the one represented.

Figure 5:
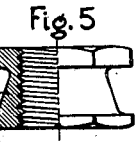
Fig. 5 is a side elevation, half in section, of a nut constituting another embodiment of the invention.

As another example, illustrated in Fig. 5, the nut has an hexagonal head 23, an intermediary conical narrowed part 24 and an hexagonal foot 25 of small height. In this embodiment, only the axial compressibility of the nut is increased; but the shortening of the nut, under the tightening force, still very efficiently intervenes to coact with the elongation of the threaded rod to produce a good bearing of the threads, and avoid detrimental permanent deformations thereof.

Figures 6, 7:
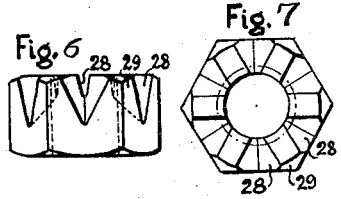
Figs. 6 and 7 show, in side elevation and in top plan view, respectively, another embodiment of the invention.

In Figs. 6-7, the nut is provided with angular and inclined transverse slots 28 which form jaws having a cross section upwardly decreasing. Such jaws present an axial compressibility which upwardly increases in accordance with the decrease in cross sectional area; and, due to this decrease, their bending causes a relatively important deflection of their upper ends. In consequence of the increased compressibility and radial extensibility of the upper part of the nut, the tightening produces in this upper part a decrease of the nut pitch predominant over the increase of the pitch of the threaded rod. And this permits of obtaining a good bearing of the threads, without detrimental permanent deformations thereof, and without any stress concentration in the threaded rod.

It is to be remarked that the nuts and bolts according to the present invention are very simple and cheap devices; and the fact that they provide a good bearing of the threads and avoid detrimental permanent deformations thereof, is the source of very precious advantages:

(1) The nut and bolt may be tightened and untightened a great number of times without prejudiciable wear or deformation of their threads;

(2) The risks of breakage of the bolt are practically eliminated;

(3) The nut keeps tightened under vibrations, for on the one hand, there is a great area of contact under high pressure between threads, and on the other hand, there is no presence in the material of overstrain liable to develop under repeated vibrations.

The invention is not limited to the embodiments described and illustrated, and many modifications and changes may be contemplated without departing from the spirit and scope of the invention.

I claim:

1. In an assembly comprising a threaded member and a nut in engagement therewith, to be tightened thereon for pressing upon a work, having a downwardly facing pressing face at its under end, and a thread with a constant radius and a greater pitch than the thread on the threaded member and arranged to provide between the two threads a play sufficient to avoid a substantial distortion of the nut prior to the tightening thereof, in combination, the thread on the nut presenting relative to the thread on the threaded member an excess of pitch difference ranging between .003 and .007 of said pitch, said nut throughout at least a substantial portion of its height being progressively reduced in cross-section away from said pressing face by an amount producing, upon tightening, a decrease of the pitch of said nut threads in said reduced portion greater than the increase in pitch of the threaded member whereby the upper faces of the nut threads will progressively engage the lower faces of the threaded member threads.

2. In an assembly comprising a threaded member and a nut in engagement therewith, to be tightened thereon for pressing upon a work, having a downwardly facing pressing face at its under end, and a thread with a constant radius and a greater pitch than the thread on the threaded member and arranged to provide between the two threads a play sufficient to avoid a substantial distortion of the nut prior to the tightening thereof, in combination, the thread on the nut presenting relative to the thread on the threaded member an excess of pitch difference ranging between .003 and .007 of said pitch, said nut having a conical narrowed part extending along a substantial portion of the nut height and being progressively reduced in cross-section away from said pressing face by an amount producing, upon tightening, a decrease of the pitch of said nut threads in said reduced portion greater than the increase in pitch of the threaded member whereby the upper faces of the nut threads will progressively engage the lower faces of the threaded member threads.

3. In an assembly as claimed in claim 2, the narrowed part being terminated at the top of the nut by a circular flange of reduced cross-section.

4. In an assembly comprising a threaded member and a nut in engagement therewith, to be tightened thereon for pressing upon a work, having a downwardly facing pressing face at its under end, and a thread with a constant radius and a greater pitch than the thread on the threaded member and arranged to provide between the two threads a play sufficient to avoid a substantial distortion of the nut prior to the tightening thereof, in combination, the thread on the nut presenting relative to the thread on the threaded member an excess of pitch difference ranging between .003 and .007 of said pitch, said nut having, on its upper part, transverse slots forming a plurality of spaced jaws extending along a substantial portion of the nut height and being progressively reduced in cross-section away from said pressing face by an amount producing, upon tightening, a decrease of the pitch of said nut threads in said reduced portion greater than the increase in pitch of the threaded member whereby the upper faces of the nut threads will progressively engage the lower faces of the threaded member threads.

5. In an assembly as claimed in claim 4, the transverse slots being angular and inclined to be deeper on the outside than on the inside of the nut.

6. In an assembly comprising a threaded member and a nut in engagement therewith, to be tightened thereon for pressing upon a work, having a downwardly facing pressing face at its under end, and a thread with a constant radius and a greater pitch than the thread on the threaded member and arranged to provide between the two threads a play sufficient to avoid a substantial distortion of the nut prior to the tightening thereof, in combination, the thread on the nut presenting relative to the thread on the threaded member an excess of pitch difference ranging between .003 of said pitch and a predetermined upper limit of the order of .007 of said pitch, said nut throughout at least a substantial portion of its height being progressively reduced in cross-section away from said pressing face by an amount producing, upon tightening, a decrease of the pitch of said nut threads in said reduced portion greater than the increase in pitch of the threaded member whereby the upper faces of the nut threads will progressively engage the lower faces of the threaded member threads, said upper limit being so predetermined that, at the end of the tightening, the upper faces of at least three nut threads are engaged with the corresponding lower faces of the threads of the threaded member, without occurrence of permanent deformations of the threaded member.

References Cited in the file of this patent

UNITED STATES PATENTS

| Number | Name | Date |
|---|---|---|
| 613,777 | Putnam | Nov. 8, 1898 |
| 1,529,161 | Britton | Mar. 10, 1925 |
| 1,922,689 | Linnenbruegge | Aug. 15, 1933 |
| 2,005,348 | Michell | June 18, 1935 |
| 2,059,853 | Daiber | Nov. 3, 1936 |
| 2,333,290 | Brackett | Nov. 2, 1943 |
| 2,382,748 | Schuttler | Aug. 14, 1945 |
| 2,406,070 | Funk | Aug. 20, 1946 |
| 2,567,483 | Hotine | Sept. 11, 1951 |